US007864940B1

United States Patent
Harvey et al.

(10) Patent No.: US 7,864,940 B1
(45) Date of Patent: Jan. 4, 2011

(54) METHOD AND APPARATUS FOR CALLING NAME CACHING IN COMMUNICATION NETWORKS

(75) Inventors: Todd A. Harvey, Branchburg, NJ (US); Christine A. Holmgren, Little Silver, NJ (US); Douglas M. Nortz, Red Bank, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1885 days.

(21) Appl. No.: 10/748,834

(22) Filed: Dec. 30, 2003

(51) Int. Cl.
*H04M 3/42* (2006.01)
*G06F 17/30* (2006.01)
*H04M 15/06* (2006.01)

(52) U.S. Cl. .............. 379/207.15; 379/142.01; 707/713; 707/770; 707/775

(58) Field of Classification Search ............ 379/142.01, 379/207.15; 707/1–10, 705, 713, 769, 770, 707/775
See application file for complete search history.

(56) References Cited

U.S. PATENT DOCUMENTS

| 5,764,745 A * | 6/1998 | Chan et al. ............. 379/221.13 |
| 6,532,490 B1 * | 3/2003 | Lewis et al. ................. 709/217 |
| 6,823,048 B2 * | 11/2004 | Gillespie ................. 379/88.19 |

\* cited by examiner

*Primary Examiner*—Harry S Hong

(57) ABSTRACT

Method and apparatus for caching caller-specific information to reduce query costs and to provide faster access when providing caller-specific information to called parties within communication networks.

8 Claims, 2 Drawing Sheets

US 7,864,940 B1

METHOD AND APPARATUS FOR CALLING NAME CACHING IN COMMUNICATION NETWORKS

The present invention relates generally to communication networks and, more particularly, to a method and apparatus for reducing costs and improving speed associated with providing information such as (but not limited to) calling name ID information to called destinations (e.g., for Caller ID services). Specifically, the present invention caches locally calling name or other caller-specific information that are provided by an external database provider such that the cached calling names are locally available for retrieval during subsequent calls from the same caller to other called destinations with Calling Party Name ID services.

BACKGROUND OF THE INVENTION

Caller ID was introduced in the public telecommunications network in the mid-late 1980s as one of the suite of "CLASS" (custom local area signal service) features that used expanded network signaling information fields and capabilities. Among other things, the expanded signaling allowed information about the calling party (originally limited to their phone number) to reach the destination switch, and even the called destination, if the called destination subscribed to "Caller ID" services. This information, when coupled with a display device at the called party's location, could display the phone number of the calling party. The information could be read by the called party, before answering, to decide if they wanted to answer the call. In more sophisticated applications, the information could be used by called businesses to access customer records (identified by and correlated to the incoming caller number) as the call was routed to customer service attendants.

As Caller ID services caught on, a drawback was identified and mitigated. The drawback was that for most residential customers, the calling party number was of limited use. The limitation had to do with the fact that most residential users, even if they received the calling number, could not quickly associate the number with the identity of the calling party. Telephone carriers realized that they could improve the utility of the service for the vast majority of their customers by providing the name of the calling party along with the telephone number (or at least the billing name associated with the calling number). In addition to working with standards groups and vendors to expand signaling protocols to carry the additional information fields necessary to provide the service, carriers were faced with a relatively new and growing problem: in general they did not, themselves, have access to the calling name information.

At this point in the evolution of the domestic telecommunications network, divestiture had resulted in many, if not most, voice calls routinely transiting three networks: the local service provider at the calling party's location, a long distance carrier, and the local service provider at the called destination. Furthermore, the calling name information would certainly have been in the records of the local provider providing service to the calling party, but would not have been generally known to either the long distance carrier or the destination's local provider. One artifact of this state of the industry was that local carriers tended to provide billing services to the long distance carriers who did not generally have the infrastructure to bill clients directly.

As a result, Calling Party Name ID Services were constructed such that the local carrier of the Calling Party would provide (in addition to the calling number) the Calling Party Name ID in additional signaling to the downstream carriers when requested. The local company receives compensation, in the form of a per query charge levied to the carrier requesting the information. It should be noted that there are also third parties who maintain national calling name databases as well. As margins for telecommunications services decline with declining pricing, these charges become a more and more significant cost factor in providing advanced services.

Therefore, a need exists for a method and apparatus for caching calling name information in a manner that will reduce charges resulting from database queries in a network that supports Calling Party Name ID.

SUMMARY OF THE INVENTION

In one embodiment, the present invention reduces the cost and improves the speed of providing Calling Party Name ID (or more generally, any other caller-specific information that would otherwise require a database query) to the called party by storing recent Calling Party Name ID information within a carrier's network for subsequent use by other calls from the same origin to other destinations subscribing to Calling Party Name ID. The information is stored (or "cached") locally within the network serving the called party for a time deemed most suitable. This judgment is based on weighing query cost savings against the probability that the information will change over time (e.g., the number will be disassociated from one name and associated with another).

Thus, the present method and apparatus improves call completion speed by eliminating the time required for the query to a remote database. The present method and apparatus broadly applies to any data residing in a remote database that might be queried by the terminating switch. The present invention is particularly useful and applicable to data that is relatively long lived, such as Calling Party Name ID and E-911 call routing for a specific calling destination.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to circuit-oriented communications networks. These networks include, but are not limited to, voice switches for originating, transiting, and terminating the voice calls. As already discussed, different operators may own and operate each of these three network pieces (originating, transiting, and terminating). In fact, it is also possible that any one segment (e.g., the transiting portion) be provided by several different network operators. The networks will also include transmission networks which may include some or all of the following: an optical switch or optical cross connect network, an Asynchronous Transfer Mode (ATM) network, a Frame Relay network, a network of Multi-Protocol Label Switching (MPLS) enabled label switched routers, and a network of Lambda (optical wavelength) routers.

These networks consist of a number of switches connected by communication links. There could be multiple links between a given pair of switches and not every possible pair of switches needs to be directly connected. Links could be of various sizes that are generally expressed in bandwidth units such as DS1, DS3, OC3, OC12, OC48, etc. In all such networks, circuits are provisioned between pairs of switches and numerous classes of services are carried on these circuits. Voice calls are connected through switches to other switches and to end (originating or terminating) switches, which are connected to the phones users employ to make the calls.

These networks are characterized by the fact that some intelligence is distributed in every switch and some is centralized in one or more central locations. Particularly relevant for this discussion, Calling Party Name ID information is stored in one or more centralized databases by the operator servicing the originating caller.

Any coordination of activities between switches is accomplished by sending control messages to each other in ways prescribed by the routing and signaling protocols. For packet-based networks, the control messages are routed along the same transmission paths used by the data and are distinguishable by their distinct header information (e.g., specific destination ID, control packet identified, etc.). For more traditional voice networks, a separate signaling network, with distinct facilities, and even its own switches, carries the signaling traffic.

Figure 1:
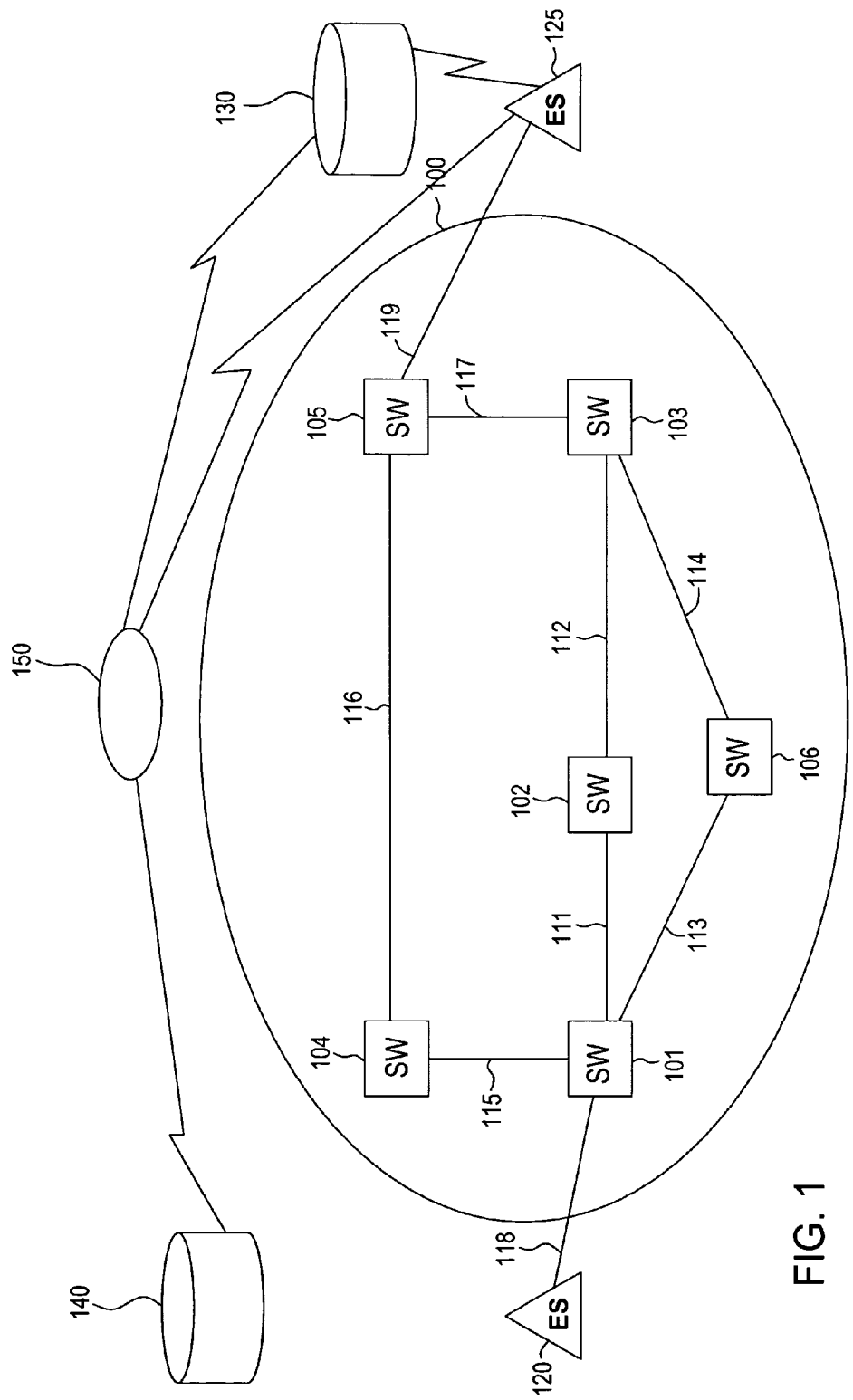
FIG. 1 illustrates a block diagram of communication networks cooperating to provide Calling Party Name ID services, comprising a calling name database, a calling name cache, a local switch or softswitch, and a called destination.

To better understand the present invention, a description of the components of such communication networks is provided below. FIG. 1 shows an exemplary communication network 100 of the present invention. The communication network 100 comprises a plurality of switches (SW)101-106 and links 111-119. Two end switches 120 and 125 are coupled to the communication network. The case where a user connected to end switch 120 (now the originating switch) dials a user connected to end switch 125 (the terminating switch) and where additionally the dialed customer subscribes to Caller ID with Calling Party Name delivery illustrates the discovery. The discovery and the discussion below apply whether the switching technology is a traditional circuit-switched voice switch or the more recently developed softswitch voice technology.

Traditionally, the terminating switch 125 will issue individual queries to a calling name database, thereby incurring charges and call termination delays each time, for every call terminated to a called party.

The present invention minimizes such charges and call termination delays.

To illustrate, when the call setup information arrives at the terminating switch 125, the switch recognizes (through internal or external associated databases) that the called party subscribes to Caller ID with Calling Party Name delivery. Depending on privacy restrictions, the terminating switch 125 determines whether the information can be forwarded to the called party. If the information is to be forwarded, the switch sends the calling number information to the calling name cache 130 to query for the calling name. The calling name cache 130 determines if it contains the Calling Party Name associated with the calling number. If it does, the Calling Party Name is returned to the terminating switch 125 and the switch completes the call to the called party, with the Caller ID and Calling Party Name information. While depicted separately in FIG. 1, the cache 130 may be a single device serving several terminating switches, a single device serving a single switch, or a component existing within the same equipment housing as the switch or softswitch. Additionally, a single cache or multiple caches may be employed for one or several caching purposes (e.g., calling name, E-911 routing information, or other information).

If the calling name cache 130 does not contain the Calling Party Name associated with the calling number, the calling name cache queries the calling name database 140 (generally associated with or owned by the caller's network provider) for the Calling Party Name information. The query is transmitted via the signaling network 150 used between the networks. In one embodiment, the signaling network 150 is represented as a CCS network as used by the modern voice switching network. Alternative methods, such as the signaling packets in VoIP networks, could also be used. Softswitch architectures typically employ a CCS7 signaling interworking gateway. The calling name database 140 returns the Calling Party Name information to the calling name cache (generally charging a fee, or recording query data to be used to generate a bill to the terminating switch network operator). The calling name cache stores the retrieved Calling Party Name information for future use. The calling name cache also sets a limited time period ("time to live") to limit the time the information will be stored locally. For example, the limited time period can be defined in accordance with business policies and/or regulations pertaining to how quickly telephone numbers can be assigned or reassigned. Another exemplary factor may be how often customers can change the billing name associated with a telephone number. Finally, the calling name cache delivers the Calling Party Name information to the terminating switch 125, which forwards the information to the called party as the call is completed.

It should be noted that the above process can be adjusted in that if the calling name cache 130 does not contain the Calling Party Name associated with the calling number, then the terminating switch may query the calling name database 140. Thus, the calling name cache 130 may simply respond negatively to the terminating switch. In turn, the terminating switch may then send the acquired result to both the called party for display and the calling name cache 130 for future use. Thus, although FIG. 2 below describes an illustrative querying method for retrieving caller-specific information where the calling name cache 130 queries the calling name database 140, it should be noted that FIG. 2 can be adjusted such that the terminating switch queries the calling name database 140 instead. For example, steps 260-295 can be amended to reflect that the terminating switch queries the calling name database 140 instead and provides the result to both the called party and the calling name cache 130.

It should be understood that the present invention can be employed in applications other than Calling Party Name information. For example, the present invention can be employed in other network related applications that require database lookups. Principal motivations for the application of this invention can be reducing costs by avoiding fees associated with data lookups between carriers and the time saved in call completion by avoiding the lookup process. These additional applications include, but are not limited to, customer-based priorities, specialized call handling requirements, and other user-specific data.

In addition, it should be understood that the present invention can be employed regardless of the switching technology employed. That is, it applies to services provided by networks comprising traditional voice switching technology, as well as new networks based on softswitch technology.

Furthermore, it should be understood that the present invention of information caching could also be used by originating switches for access to data that might otherwise require a relatively slow database query where a call is originated (for example, to check caller permissions, billing authorizations, or other data).

Figure 2:
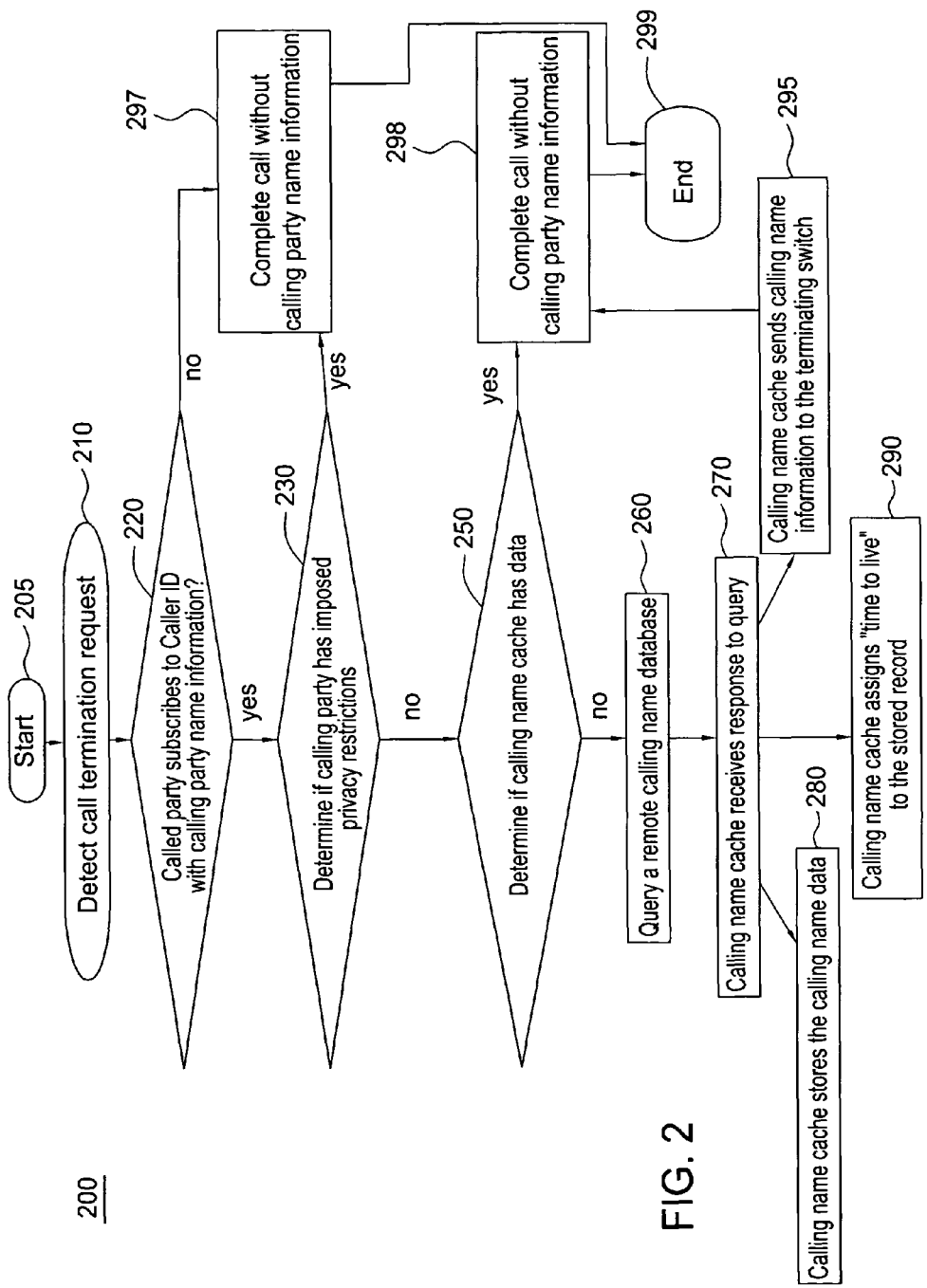
FIG. 2 illustrates a flowchart of a caching method for storing and retrieving Calling Party Name ID information of the present invention.

FIG. 2 illustrates a flowchart of a querying method 200 for retrieving caller-specific information, e.g., Calling Party Name information, during call setup at the terminating switch.

In step 210, method 200 detects a call termination request.

In step 220, method 200 queries whether the called party subscribes to Caller ID with Calling Party Name information. If the query is negatively answered, then method 200 proceeds to step 297 where the call is completed without calling party name information. If the query is positively answered, then method 200 proceeds to step 230.

In step 230, method 200 queries whether privacy restrictions (associated with the calling party) prohibit the delivery of the calling party name information. If the query is positively answered, then method 200 proceeds to step 297 where the call is completed without calling party name information. If the query is negatively answered, then method 200 proceeds to step 240. Namely, a Calling Party Name lookup is required.

In step 250, method 200 queries whether the requested information is stored within the cache. More specifically, the terminating switch sends the calling number to the calling name cache to query for the Calling Party Name information. If the query is positively answered, then method 200 proceeds to step 298 where the call is completed with the calling party name information retrieved from the local cache. If the query is negatively answered, then method 200 proceeds to step 260.

In step 260, method 200 launches a query to the calling name database for the Calling Party Name information. Namely, method 200 attempts to acquire the calling party name information remotely from a third party provider, e.g., a local service provider that maintains such information.

In step 270, the calling name cache receives the Calling Party Name information.

In step 280, method 200 stores the Calling Party Name information in the calling name cache.

In step 290, method 200 assigns a limited time period, e.g., "time to live", that defines the length of time that the recently received Calling Party Name information should be stored in the calling name cache. Stored information that exceeds the limited time period will be deleted from the cache because it is presumed that the information may no longer be accurate.

In step 295, method 200 returns the calling name to the terminating switch/softswitch. More specifically, the calling name cache delivers the Calling Party Name information to the terminating switch to be included in the call setup information.

In step 298, method 200 completes call setup through the terminating switch and to the called party, delivering the Caller ID information, including the name of the called party. Method 200 ends in step 299.

The method of FIG. 2 is now described with respect to FIG. 1. Using the call from a user connected to originating switch 120 to a user connected to terminating switch 125 considered above as an example. Once steps 210 220 and 230 have been performed, switch 125 launches a query to the calling name cache 130. Calling name cache 130 will check the conditions in step 250 and if necessary, launch a query (step 260) to the calling name database 140. Calling name database 140 returns the Calling Party Name ID information to the calling name cache 130 in step 270.

In no particular order, or simultaneously, the calling name cache 130 executes steps 280, 290, and 295. Step 295, sending the Calling Party Name information to the terminating switch 125, may be preferentially performed first, as that would speed the completion of the call. Steps 280 and 290 can be performed nearly simultaneously; caching the Calling Party Name for future lookup and setting the "time to live" value for the data to reside in the calling name cache 130.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for acquiring caller-specific information, the method comprising:
   receiving a call for completion from a calling party;
   querying a local cache for caller-specific information associated with the calling party, wherein the caller-specific information is associated with a time-to-live time period;
   obtaining the caller-specific information from the local cache if the caller-specific information is found in the local cache;
   forwarding the caller-specific information to complete the call; and
   querying a remote database if the caller-specific information is not found in the local cache, wherein the querying the remote database is performed by the local cache over a signaling network different from a communication network carrying the call.

2. The method of claim 1, wherein the caller-specific information is a calling name of the calling party.

3. The method of claim 1, further comprising:
   obtaining the caller-specific information from the remote database.

4. The method of claim 3, further comprising:
   storing the caller-specific information obtained from the remote database in the local cache.

5. The method of claim 4, further comprising:
   defining a limited period of time for the time-to-live time period wherein the caller-specific information obtained from the remote database is to be stored in the local cache.

6. An apparatus for acquiring caller-specific information, the apparatus comprising:
   means for receiving a call for completion from a calling party;
   means for querying a local cache for caller-specific information associated with the calling party, wherein the caller-specific information is associated with a time-to-live time period;
   means for obtaining the caller-specific information from the local cache if the caller-specific information is found in the local cache;
   means for forwarding the caller-specific information to complete the call; and
   means for querying a remote database if the caller-specific information is not found in the local cache, wherein the means for querying the remote database is performed by the local cache over a signaling network different from a communication network carrying the call.

7. The apparatus of claim 6, wherein the apparatus is a switch.

8. A system for acquiring caller-specific information, the system comprising:

a local cache for querying a remote database if caller-specific information is not found in the local cache over a signaling network different from a communication network carrying a call, wherein the caller-specific information is associated with a time-to-live time period; and a switch for receiving the call for completion from a calling party, wherein the switch queries the local cache for the caller-specific information associated with the calling party, and wherein the switch obtains the caller-specific information from the local cache if the caller-specific information is found in the local cache and forwards the caller-specific information to complete the call.

* * * * *